Figure 1:
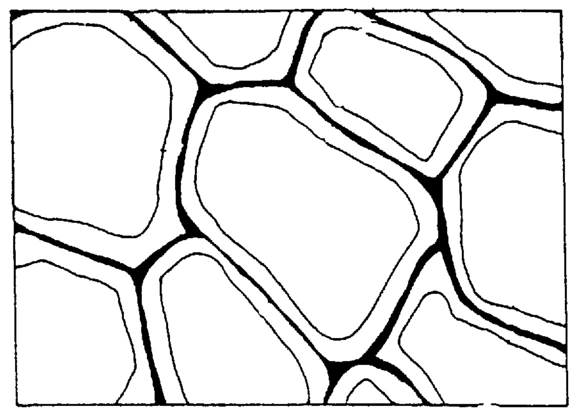

US005817250A

United States Patent [19]

Mauczok et al.

[11] Patent Number: 5,817,250

[45] Date of Patent: Oct. 6, 1998

[54] MAGNETODIELECTRIC CERAMIC COMPOSITE MATERIAL, METHOD OF MANUFACTURING SAME

[75] Inventors: Rüdiger Mauczok, Erkelenz; Joseph Pankert, Aachen, both of Germany; Vassilios Zaspalis, Heerlen, Netherlands

[73] Assignee: U.S. Philips Corporation, New York, N.Y.

[21] Appl. No.: 818,194

[22] Filed: Feb. 14, 1997

Related U.S. Application Data

[63] Continuation of Ser. No. 697,120, Aug. 20, 1996, abandoned, which is a continuation of Ser. No. 488,542, Jun. 7, 1995, abandoned.

[30] Foreign Application Priority Data

Jun. 8, 1994 [DE] Germany .......................... 44 20 029.3

[51] Int. Cl.[6] ........................... C04B 35/26; C06B 35/64; H01R 1/20

[52] U.S. Cl. .................................... 252/62.51; 252/62.62; 252/62.58; 252/62.56

[58] Field of Search .............................. 252/62.58, 62.62, 252/62.56, 62.51

[56] References Cited

FOREIGN PATENT DOCUMENTS 394107 10/1990 European Pat. Off. .
2952441 7/1980 Germany .

*Primary Examiner*—Melissa Bonner
*Attorney, Agent, or Firm*—Norman N. Spain

[57] ABSTRACT

A magnetodielectric ceramic composite material comprising a first disperse phase which contains one or more magnetic ferrites, and a second, essentially continuous phase which contains electrically insulating oxides, characterized in that the electrically insulating oxides are lead(II) oxide, bismuth (III) oxide and, optionally, boron(III) oxide, is distinguished by an improved construction of the surface boundary layer. Said composite material can very suitably be used for the manufacture of frequency-selective components and wide-band transmitters having a high initial permeability and a high critical frequency $f_0$ in the range from 1 . . . 200 MHz, and for the manufacture of monolithic, multifunctional components. A description is given of a simple method of manufacturing said composite material.

12 Claims, 1 Drawing Sheet

MAGNETODIELECTRIC CERAMIC COMPOSITE MATERIAL, METHOD OF MANUFACTURING SAME

This is a continuation of application Ser. No. 08/697,120, filed Aug. 20, 1996, now abandoned, which is a continuation of application Ser. No. 08/488,542, filed Jun. 7, 1995, now abandoned.

The invention relates to a ceramic composite material for an electronic component, in particular a magnetodielectric ceramic composite material comprising a first phase of disperse crystallites, which contains one or more magnetic ferrites, and a second, essentially continuous phase which contains electrically insulating oxides.

The invention further relates to a method of manufacturing such a magnetodielectric ceramic composite material as well as a monolithic multifunctional electronic component comprising such a composite material.

In EP 0 394 107 A1, there is disclosed a dielectric ceramic composition which comprises semiconductive ferrite crystallites which are separated by a substance which forms an intergranular surface boundary layer and which is composed of $Bi_2O_3$ and at least an oxide selected from the group formed by PbO, $Li_2O$, $SiO_2$, $B_2O_3$, $Fe_2O_3$, $Na_2O$ and $K_2O$. EP 0 394 107 A1 particularly relates to magnetodielectric ceramic substances on the basis of nickel-zinc ferrites which have particular dielectric properties which can be optimized for the intended application.

EP 0 394 107 A1 also discloses a method of manufacturing the above-mentioned dielectric ceramic composition, which is characterized in that a semiconductive ferrite is manufactured by sintering and impregnated with a liquid mixture comprising $Bi_2O_3$ and at least another component selected from the group formed by $Li_2O$, PbO, $SiO_2$, $B_2O_3$, $Fe_2O_3$, $Na_2O$ and $K_2O$.

To impregnate the ferrite, use can be made, in particular, of the following steps:

1) manufacturing a suspension of the mixture of $Bi_2O_3$ and one or more of the other components and/or their starting compounds in a highly volatile liquid, 2depositing said mixture on the ferrite by applying the suspension, whereafter a drying operation is carried out to evaporate the solvent, 3) heating the ferrite coated with the mixture to an impregnation temperature at which the mixture should have melted, and 4) maintaining the ferrite at said temperature for a period of time $D_i$ which is sufficient to form the intergranular surface boundary layer.

The magnetodielectric composition thus manufactured exhibits low values for the dielectric constant $\epsilon$ and the magnetic permeability $\mu$, while the loss factors of the permeability, being $\mu_{r''}/\mu_{r'}$>>100%, are very high. Consequently, said composition is a typical high-frequency absorption material.

It is an object of the invention to provide a magnetodielectric ceramic composite material having improved properties of the intergranular surface boundary layer, said composite material having very low loss factors and a high initial permeability.

This object is achieved in accordance with the invention by the manufacture of a magnetodielectric ceramic composite material of the type mentioned in the opening paragraph, which is characterized in that the electrically insulating oxides are lead(II) oxide, bismuth(III) oxide and, optionally, boron(III) oxide.

The electrically insulating lead(II) oxide, bismuth(III) oxide and, optionally, boron(III) oxide interact with the ferrite components of the disperse phase, thereby forming a thin insulating film along the grain boundaries, i.e. along the intergranular surface boundary layer.

The lead(II) oxide in the mixture of electrically insulating oxides surprisingly causes the surface boundary layer to be very uniform and thin. The crystallites themselves remain substantially free of chemical changes, because the electrically insulating oxides are concentrated at the grain boundary. By virtue thereof, their magnetic properties also remain intact.

However, despite the high grain conductivity of the ferrites, the electrical resistance of the composite material is overall very high. Said material has very small loss angles of the magnetic permeability $\mu$ and of the dielectric constant $\epsilon$ with values for $\tan\partial_\mu$ and $\tan\Delta_{68}$<10%. By virtue thereof, the material is very suitable for applications in which the magnetic loss factors should be as small as possible, for example inductors, filter coils, power transformers and transducer systems.

Within the scope of the invention, the magnetodielectric ceramic composite material preferably comprises the electrically insulating lead(II) oxide, bismuth(III) oxide and, optionally, boron(III) oxide in the following molar weight ratios 30<mol % PbO<80

0<mol % $Bi_2O_3$<40

0≦mol % $B_2O_3$≦30.

In accordance with a particularly preferred embodiment, the electrically insulating oxides are formed by the eutectic mixture of lead(II) oxide and bismuth(III) oxide. Said mixture comprises, approximately, 73 mol % PbO and 27 mol % $Bi_2O_3$.

This mixture forms a microstructure having an optimum intergranular surface boundary layer and a low porosity. By virtue of this optimum microstructure, the magnetic losses are reduced and the dielectric constant is high.

In accordance with a further, preferred embodiment, the electrically insulating oxides are formed by the ternary eutectic mixture of lead(II) oxide, bismuth(III) oxide and boron(III) oxide. This eutectic mixture can be used at very low temperatures.

Within the scope of the invention, it is preferred that the magnetic ferrites are cubic ferrites having a spinel structure.

A magnetodielectric ceramic composite material which is characterized in that the cubic ferrites having a spinel structure are manganese-zinc ferrites, has particular advantages.

Manganese-zinc ferrites which have a high saturation magnetization and a low crystalline, magnetic anisotropy are preferably used for applications in the low-frequency range, i.e. ≦1 MHz. As a single-phase sintering material, said ferrites have the disadvantage that they have a very low electrical resistance. However, by forming a thin insulating film at the grain boundaries in accordance with the invention, the resistance of the composite material increases by several decimal powers. Besides, as a result of the very uniformly structured intergranular surface boundary layer, the eddy-current losses are very low.

Consequently, an inventive composite material on the basis of Mn-Zn ferrites is characterized by very small loss angles of $\tan\partial_\mu \approx \tan\partial_\epsilon$<10% at a high value of $\mu$ and a very high value of $\epsilon$. It has surprisingly been found that such a composite material is particularly suitable for frequency-selective components and broadband transmitters having a high initial permeability and a high critical frequency $f_0$ of 1 . . . 200 MHz.

Preferably, the ferrites are monodisperse crystallites having a grain size in the range form 1 to 50 $\mu$m.

It is particularly preferable that the ferrites are monodisperse crystallites having a grain size in the range from 5 to 15 μm.

Preferably, the magnetodielectric ceramic composite material comprises the electrically insulating oxides in a quantity of 0.5 to 10% by weight.

By varying the quantity in the first phase, which creates the magnetic properties, and in the second phase, which creates the dielectric properties, the material can be optimized for a specific application.

It is particularly preferable that the material comprises the electrically insulating oxides in a quantity of 1 to 3% by weight.

The invention further aims at providing a simplified method of manufacturing such a magnetodielectric ceramic composite material.

This object is achieved in accordance with the invention by sinter-impregnation process in which a sintered ceramic moulded body comprising one or more magnetic ferrites is impregnated with a molten phase containing lead(II) oxide, bismuth(III) oxide and, optionally, boron(III) oxide.

The sintering process for the sintered moulded body of ferrites is conducted in such a manner that initially a relatively porous body is obtained. In a second step, said body is impregnated with the liquid oxide melt. Complete impregnation results in a non-porous permeated composite material.

In this method, the presence of a quantity of lead oxide in the melt is very important because it has a positive effect on the wetting properties of the melt. Re-densification by means of the sinter-impregnation process results in extremely dense moulded bodies having minimal eddy-current losses.

The impregnation process is preferably carried out at 500° to 600° C. By subsequently incorporating the intergranular surface boundary layer at relatively low temperatures, grain growth catalysed by the cations of the insulating oxides introduced, which adversely affects the magnetic properties of the crystallites, is also precluded.

It is further preferred to subject the impregnated moulded body, after the impregnation process, to a tempering operation for 1 to 30 hours at 600° to 900° C. By virtue thereof, the microstructure of the moulded body is homogenized and stresses, if any, disappear.

Following the tempering operation, the parts may optionally be subjected to a post-treatment. By virtue of the relatively small shrinkage of 3–4% during impregnating and subsequently tempering, post-treating the moulded bodies is easier or can be dispensed with.

The composite material thus manufactured is advantageously used to manufacture an electronic component, such as coils and transmitters, microwave components and relays, and in particular for the manufacture of a frequency-selective magnetic component.

Another aspect of the invention relates to a monolithic multifunctional electronic component comprising the inventive magnetodielectric ceramic composite material.

The magnetodielectric properties of the material render said material suitable for multifunctional components, i.e. components which combine the functions of a number of components in one component. For example, a specific multifunctional component in accordance with the invention can be used simultaneously as a coil and as a capacitor, i.e. as a monolithic LC ladder filter.

Another multifunctional component in accordance with the invention is an EMI-filter having an integrated (data)-line.

These and other aspects of the invention will be apparent from and elucidated with reference to the embodiments described hereinafter.

In the drawings:

FIG. 1 schematically shows the microstructure of the magnetodielectric composite material in accordance with the invention.

Figure 2:
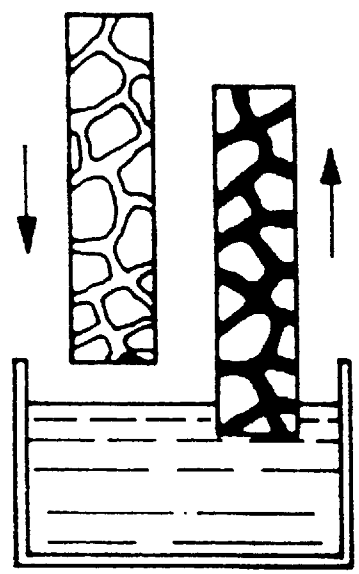

FIG. 2 schematically shows the steeping process used to manufacture the inventive composite material.

Figure 3:
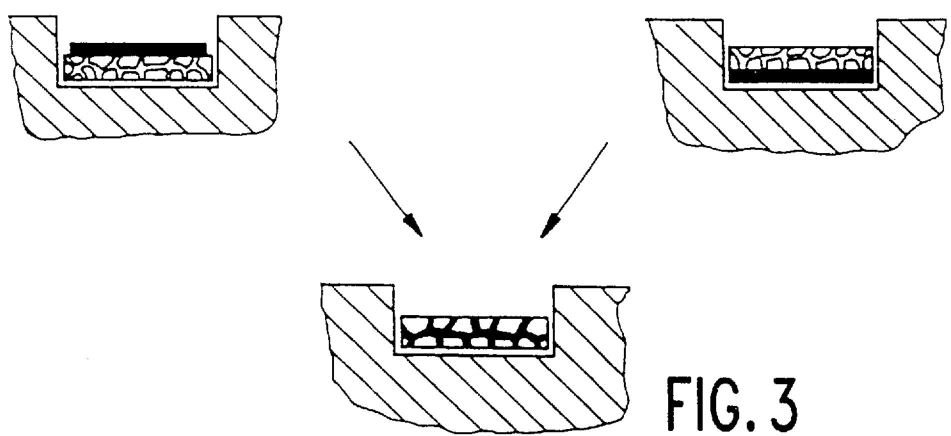

FIG. 3 schematically shows the overlay and underlay impregnation process for the manufacture of the composite material in accordance with the invention.

The magnetodielectric ceramic composite material in accordance with the invention comprises a first phase which contains dispersed crystallites of one or more ferrites. Said phase can also contain ceramic auxiliary agents, such as permanent binders or sintering agents.

The ferritic materials used for the invention can be distinguished from each other by their different crystal structure. Generally, the following ferrites are used: cubic ferrites having a spinel structure hexagonal ferrites having a magnetoplumbite structure hexagonal ferrites having superstructures ferrites having a garnet structure and/or orthoferrites.

The manganese-zinc ferrites preferably used for the invention are cubic ferrites having a spinel structure. They are of the composition $AB_2O_4$, wherein A represents the octahedral lattice sites and B represents the tetrahedral lattice sites in the spinel structure. Said lattice sites can be provided in known manner with a plurality of cations of suitable size and oxidation number. For example, the A-sites can be substituted with one or more of the cations $Mn^{2+}$, $Zn^{2+}$, $Ni^{2+}$, $Mg^{2+}$, $Co^{2+}$, $Fe^{2+}$, and the B-sites can be substituted with one or more cations, such as $Fe^{3+}$ and $Co^{3+}$. Further possible substitutions are described in E. W. Gorter, Phillips Res. Rep. 9 (1954), 295 ff.

These cubic ferrites having a spinel structure are soft ferrites, i.e. the direction of magnetization is reversed rapidly at the rhythm of the field of the generator. Soft ferrites are generally manufactured by first subjecting the starting materials, i.e. oxides, carbonates etc., to grinding and mixing operations. For both operations, use can be made of either dry or wet processes. Subsequently, the starting mixture is calcined at approximately 1000° C. If the intended application is such that the ferrites do not have to meet high requirements, calcination of the starting mixture can be dispensed with. After calcination, the powder is again subjected to a wet-grinding operation in a ball mill, vibratory mill or attrition mill. Subsequently, binders, plasticizing agents, liquefiers and other ceramic auxiliary materials are added. Typically, for example, polyvinyl alcohol, polyethylene glycol and ammonium lignosulphate are added. Alternatively, the ceramic powder can be coated first with an organic binder and then suspended in water, which results in a very porous ceramic material after the binder has been burned out. The slurry thus prepared is then subjected to a spray drying treatment. The spray-dried granulate is compressed to magnetic elements in high-power presses.

The geometry of the structural shapes is adapted to the particular applications. Preferred geometries are ring cores, U-shaped cores, multi-hole cores
open cores, screw cores and cylinder cores
shielded cores, such as pot cores, X-cores and RM-cores
UU, UI, EE, EI and EC-cores
prisms, blocks, plates and balls.

The temperatures at which the moulded bodies are sintered are lower than the temperatures conventionally used for the manufacture of ferrites. Thus, sintering is carried out at temperatures between 1000° C. and maximally 1300° C. and the process is conducted so that the sintered moulded bodies retain an open porosity of 2–20%.

For some ferrites, such as Mn-Zn ferrite, controlling the furnace atmosphere is very important for the formation of the desired chemical composition. Consequently, the furnace atmosphere generally comprises nitrogen whose oxygen content varies with temperature. The furnace curve must be controlled in such a manner that the porosity is intergranular and not intragranular. The grain size should be monodisperse without duplex structures. Particularly in the case of applications at higher critical frequencies, the grain size should be small and the porosity relatively high.

Subsequently, the composite material is manufactured by infiltration of the porous ferrite sintered body with a melt or solution of the electrically insulating oxides. In addition to the electrically insulating lead(II) oxide, bismuth(III) oxide and optionally boron(III) oxide, this second, essentially continuous phase may also comprise ceramic auxiliary substances such as ceramic binders, sintering agents, grain growth inhibitors and such.

Overlay and underlay impregnation in accordance with FIG. 3 constitute an infiltration technique which is particularly suitable for impregnating with melts. Solutions can more suitably be applied by means of the steeping process in accordance with FIG. 2.

In the overlay or underlay impregnation process, the required quantity of impregnating oxides is disposed, for example, as a prefabricated moulded body (feeder) or as a loose powder on or underneath the porous ferrite body, whereafter the pore space of the ferrite skeleton is filled in a heat treatment at a temperature above the melting temperature of the relevant impregnating oxides. In this process, the cooperation of capillary forces, gravity and etch operations at the grain boundaries ensure that the impregnating oxides are drawn into the pores of the ferrite skeleton. Melts comprising lead(II) oxide demonstrated a surprising improvement in wetting and reaction properties. The process can be accelerated by carrying it out under a vacuum.

The melt generally comprises lead(II) oxide, bismuth(III) oxide and, optionally, boron(II) oxide as the oxides. It is alternatively possible to use starting compounds, such as carbonates, hydroxides and other oxycompounds, which do not decompose to the oxides until the temperature of the melt has been attained.

The ferrite moulded body is tempered in contact with the melt in a nitrogen atmosphere for 2 to 10 hours, whereafter it is cooled and, optionally, post-treated.

In the steeping process, the sintered skeleton of the ferrite is partially or completely immersed in a liquid comprising the impregnating oxides. Preferably, solutions are used for the steeping process. The solution for the steeping process may comprise the oxides or starting compounds for the oxides, such as nitrates, carbonates, oxychlorides. For the solvents use is made of polar solvents such as water or alcohols, either pure or mixed. Infiltration under a vacuum accelerates the process. The impregnated parts are dried and subsequently tempered for several hours at 700° to 1000° C. In this process, the initially porous ceramic material shrinks to form a dense moulded body of the composite material and hence attains the densities of conventionally sintered ferrites.

The composite material in accordance with the invention can advantageously be used for inductors, filter coils and power transformers for the communications and measuring techniques, consumer electronics or power supply technique, for microwave components for the wireless communications technique and for wideband signal transmitters.

The composite material in accordance with the invention can particularly suitably be used, however, for a multifunctional monolithic electronic component.

In view of the trend towards miniaturization of electronic components, multifunctional components are becoming ever more important since the packing density of discrete components in electronic circuits cannot be increased indefinitely. This applies, in particular, to passive components such as capacitors and coils. They are often used in specific configurations, for example, as so-called LC ladder filters. In recent years the aim has been to combine these components into a single monolithic module.

At present, the single-component capacitors are generally made from ceramic dielectric materials, such as barium titanate or lead-zirconium titanate, which are sintered along with the electrodes at high temperatures. Said materials are characterized by a high electrical resistance $\rho>10^6$ Ωm and a high dielectric constant $\epsilon>1000$.

These properties can also be realised with composite materials which are used as so-called “surface boundary layer capacitors or intergranular layer capacitors”. Said composite materials are ceramic polycrystalline materials which, unlike the above-mentioned dielectric materials, are good conductors. The material is turned into a dielectric by providing insulating second phases at the grain boundaries. These thin insulating layers ensure that an applied electric field decreases only across these layers and not in the electroconductive interior of the crystallites.

This results in an effective dielectric constant $$\epsilon_{eff}=\epsilon_{layer}\cdot d/\partial.$$

The designation $\epsilon_{layer}$ is to be understood to mean herein the intrinsic dielectric constant of the insulating layer, d and $\partial$ denote the average gain size of the crystallites and the average layer thickness of the insulating layer, respectively. These materials enable dielectric-constant values $\epsilon$ up to $10^5$ to be achieved, however, the insulation properties of the material and hence the loss properties deteriorate clearly as the layer thickness decreases.

At present, also magnet coils for frequency-selective components are manufactured as single components on the basis of ceramic materials. In order to maximize the inductances per volume unit, said material must combine a high permeability in the desired frequency range with the minimum of magnetic losses. In practice, the only suitable materials are ferrites having a spinel structure. In this respect, Mn-Zn ferrites having a very high permeability in the frequency range <1–5 MHz and Ni-Zn ferrites having a very high permeability in the range up to 500 MHz are specially mentioned. The dielectric properties of these ferrites are determined by their relatively high conductivity, i.e. as single-phase materials, their dielectric losses are so high that they cannot be used as a dielectric.

Well-known multifunctional components combining, for example, the function of coils and capacitors are consequently composed of a number of individual elements whose construction is similar to that of discrete coils and capacitors, which must be sintered together. However, this leads to exceptionally great difficulties at the interfaces of the materials since different materials, i.e. on the one hand magnetic materials and on the other dielectric materials, must be sintered together. To preclude interdiffusion of ions at the interface, very low sintering temperatures are used. As a result, the properties of the sintered multifunctional component contrast very poorly with those of discretely manufactured components. A further problem is formed by the different shrinkage rates during sintering and the different coefficients of thermal expansion, which factors may lead to stresses and cracks at the interface. This results in rejects at a later stage in the manufacturing process. Consequently, the only dielectric material which can be used in practice is $TiO_2$. However, as is known, $TiO_2$ has a low dielectric constant $\epsilon<100$, so that the advantage obtained by miniaturization is to a substantial extent counteracted by the small volume capacitances.

The inventive magnetodielectric ceramic material enables, however, a monolithic multifunctional electronic component to be manufactured which, by means of a single material, combines, for example, the functions of a capacitor and an inductor and which hence forms a monolithic LC ladder filter.

To manufacture a monolithic LC ladder filter in accordance with the invention, a laminate is produced first, which is composed of green ceramic foils comprising ferrites, each foil being printed with a section of a coil pattern by means of a metallizing paste, as described in DE-A-29 52 441.

First, the starting oxides for the spinels are broken, ground and classified. A binder preparation is added thereto to form a ceramic foil which is cut into individual plates. These plates are screen printed with a metallizing paste in accordance with the pattern for the coils and the electrodes. The foils are then stacked and laminated. The foil packets are optionally subdivided into individual products, whereafter the binder is burned out and subsequently the product is sintered to a defined residual porosity. Subsequently, said product is subjected to further treatments in accordance with one of the above-mentioned impregnation methods. The products are then separated and the end contacts are provided.

An EMI-filter in accordance with the state of the art is composed, for example, of a ferrite tube which is arranged above a (data) line, so that the inductance of the line is increased and high-frequency portions of the signal are filtered out. Alternatively, a capacitance can be arranged between the supply line and the return line. A multifunctional EMI-filter in accordance with the invention can carry out both functions simultaneously, as the supply line and return line are provided on the inside or outside of a tube made from the material in accordance with the invention. By virtue thereof, filtering is substantially improved as compared to the solutions used so far.

EXAMPLE 1

The Manufacture of Manganese-zinc-ferrite

For the manufacture of a manganese-zinc-ferrite, such as $Mn_{0.655}Zn_{0.254}Fe_{0.091}{}^{2+}Fe_2{}^{3+}O_4$, iron oxide $Fe_2O_3$ manganese oxide $Mn_3O_4$ and zinc oxide ZnO are weighed-in in the molar ratios, whereafter they are decomposed with distilled water and mixed in the wet state in a steel ball mill. The mixture is dried and calcined at 850° C. for three hours. After calcining, the powder is ground again in a steel ball mill in an aqueous suspension for three hours and dried. Next, the powder is granulated by decomposing it with ammonium alginate as the binder, pressing it through a sieve having a mesh size of 1 mm and, subsequently, working it in a granulation drum to form a granulate. The granulate is subsequently subjected to a pressure of 50 MPa to form otrodial rings having an outer diameter of 16.8 mm, an inner diameter of 10.9 mm and a height of approximately 6 mm, whereafter they are dried at 135° C. in 24 hours. Said green rings are subsequently sintered in air at 1300° C. for 3 hours, after which they are slowly cooled in an equilibrium atmosphere.

Sinter-impregnation Process

Simultaneously, a eutectic mixture of $Bi_2O_3$ (27 mol %) and PbO (73 mol %) was weighed in and homogenized in a mortar. This mixture was granulated and pressed to form thin rings having the same inner and outer radii as the ferrite rings and a height of 100–300 $\mu$m, whereafter they were sintered in air at 590° C. for one hour. In a final step, the rings of $Bi_2O_3$ and PbO were arranged on top of or underneath the ferrite rings and tempered in an $N_2$ atmosphere at temperatures between 620° and 650° C. for 2 to 10 hours. In this tempering process, a melt is formed which comprises $Bi_2O_3$ and PbO as well as constituents of the ferrite, said melt diffusing into the sintered ferrite along the grain boundaries. After cooling of the melt, a homogeneous electrically insulating second phase remains at the grain boundaries.

EXAMPLE 2

Manufacture of Manganese-zinc-ferrite

A manganese-zinc-ferrite is manufactured in the same manner as described in example 1. However, it is sintered at lower temperatures, for example at 1100° C. for 3 hours. This measure results in a higher porosity of the ceramic moulded body and it allows impregnation of said body with low-viscosity liquids, such as aqueous solutions.

Sinter-impregnation Process

An aqueous solution comprising 2 g $Pb(NO_3)_2$ and 1 g $Bi(NO_3)_3$ to 100 ml of distilled water is prepared and the pH value is brought to a value between 3 and 4 by means of hydrochloric acid. The ferrite rings are introduced into a vacuum vessel, impregnated with the lead and bismuth-containing solution in a vacuum and subsequently dried. Optionally, this process step can be repeated once or a number of times.

Subsequently, the ring is tempered for four hours at temperatures of approximately 950° C. In this process, the porous ceramic material is sintered to a dense body. Linear shrinkage is approximately 3–4%.

Test Results

For the magnetic characterization, a copper wire is subsequently wound around the rings. The permeability and magnetic loss $\tan\partial_\mu$ are determined by means of an impedance spectrometer.

For the electrical characterization, a thin disc having a surface area of 2×3 mm and a height of 2 mm is made from the material, whereafter the disc is bilaterally contacted with conductive silver and, subsequently, the dielectric constant $\epsilon$ and the dielectric losses $\tan\partial_\epsilon$ are measured by means of the same impedance spectrometer. The direct-current resistance is measured with a conventional ohmmeter.

Table 1 lists the results for 2 examples. $\epsilon_{eff}$ is the effective dielectric constant, $\tan\partial_{68}$ is the coefficient of the dielectric losses, $\mu_{eff}$ is the effective magnetic permeability, $\tan\partial_{\mu}$ is the coefficient of the magnetic losses, ρ is the direct-current resistance.

| Example | Tempering | Measuring frequency | $\epsilon_{eff}$ | $\tan\delta_{\epsilon}$ | $\mu_{eff}$ | $\tan\delta_{\mu}$ | ρ |
|---|---|---|---|---|---|---|---|
| 1 | 620° C./10 h | 1 MHz | 3300 | 9.7% | 65 | 2.0% | $10^5$ Ωm |
| 1 | 620° C./10 h | 10 MHz | 2900 | 10.7% | 62 | 7% | $10^5$ Ωm |
| 1 | 640° C./4 h | 1 MHz | 665 | 5% | 45 | 3% | $10^6$ Ωm |
| 1 | 640° C./4 h | 10 MHz | 586 | 9,6% | 44 | 5% | $10^6$ Ωm |

We claim:

1. A mangetodielectric ceramic composite material comprising a first disperse phase which comprises one or more magnetic ferrites, and a second, essentially continuous, phase which contains electrically insulating oxides characterized in that the electrically insulating oxides are lead (II) oxide, bismuth (III) oxide and boron (III) oxide in the molar ratios:

$30 < \text{mol \% PbO} < 80$ $0 < \text{mol \% } Bi_2O_3 < 40$ $0 \leqq \text{mol \% } B_2O_3 < 30.$

2. A magnetodielectric ceramic composite material as claimed in claim 1, characterized in that the electrically insulating oxides are formed by the eutectic mixture of lead(II) oxide and bismuth(III) oxide.

3. A magnetodielectric ceramic composite material as claimed in claim 1, characterized in that the electrically insulating oxides are formed by the eutectic mixture of lead(II) oxide, bismuth(III) oxide and boron(III) oxide.

4. A magnetodielectric ceramic composite material as claimed in claim 1, characterized in that the ferrite or ferrites is or are cubic ferrite(s) having a spinel structure.

5. A magnetodielectric ceramic composite material as claimed in claim 1, characterized in that the ferrite or ferrites is or are manganese-zinc-ferrite(s) having a spinel structure.

6. A magnetodielectric ceramic composite material as claimed in claim 1, characterized in that the first disperse phase comprises monodisperse crystallites having a grain size in the range from 1 to 50 μm.

7. A magnetodielectric ceramic composite material as claimed in claim 1, characterized in that the first disperse phase comprises monodisperse crystallites having a grain size in the range from 5 to 15 μm.

8. A magnetodielectric ceramic composite material as claimed in claim 1, characterized in that it comprises electrically insulating oxides in a quantity of 0.5 to 10% by weight.

9. A magnetodielectric ceramic composite material as claimed in claim 1, characterized in that it comprises the electrically insulating oxides in a quantity of 1 to 3% by weight.

10. A sinter-impregnation process for the manufacture of a magnetodielectric ceramic composite material as claimed in claim 1, in which a porous sintered ceramic moulded body comprising one or more magnetic ferrites is impregnated with a molten phase containing PbO, $Bi_2O_3$ and, optionally, $B_2O_3$.

11. A method of manufacturing a magnetodielectric ceramic composite material as claimed in claim 10, characterized in that the impregnating process is followed by a tempering operation for 1 to 30 hours at 600° to 900° C.

12. A monolithic multifunctional electronic component comprising a magnetodielectric ceramic composite material as claimed in claim 1.

* * * * *